(12) United States Patent
Nestler

(10) Patent No.: US 9,195,808 B1
(45) Date of Patent: Nov. 24, 2015

(54) SYSTEMS AND METHODS FOR PROACTIVE DOCUMENT SCANNING

(75) Inventor: Roger H. Nestler, Clay, NY (US)

(73) Assignee: Exelis Inc., Herndon, VA (US)

( * ) Notice: Subject to any disclaimer, the term of this patent is extended or adjusted under 35 U.S.C. 154(b) by 1073 days.

(21) Appl. No.: 12/509,521

(22) Filed: Jul. 27, 2009

(51) Int. Cl.
*G06F 12/14* (2006.01)
*G06F 21/10* (2013.01)

(52) U.S. Cl.
CPC ........................................ *G06F 21/10* (2013.01)

(58) Field of Classification Search
CPC ....... G06F 21/12; G06F 21/62; G06F 21/629; G06F 21/70; G06F 21/121; G11B 20/00681; G11B 20/00731
USPC .................. 726/22, 27, 30; 713/147, 188; 369/53.21
See application file for complete search history.

(56) References Cited

U.S. PATENT DOCUMENTS

| | | | | |
|---|---|---|---|---|
| 7,617,532 | B1 * | 11/2009 | Alexander et al. | 726/22 |
| 7,962,385 | B2 * | 6/2011 | Falk et al. | 705/35 |
| 8,312,023 | B2 * | 11/2012 | Shields et al. | 707/742 |
| 8,838,553 | B2 * | 9/2014 | von Kaenel et al. | 707/694 |
| 2004/0111399 | A1 * | 6/2004 | Rice | 707/3 |
| 2005/0257273 | A1 * | 11/2005 | Naito et al. | 726/26 |
| 2006/0069733 | A1 * | 3/2006 | Antonoff et al. | 709/206 |
| 2006/0075228 | A1 * | 4/2006 | Black et al. | 713/167 |
| 2006/0174119 | A1 * | 8/2006 | Xu | 713/170 |
| 2006/0185018 | A1 * | 8/2006 | Saretto et al. | 726/25 |
| 2006/0277595 | A1 * | 12/2006 | Kinser et al. | 726/3 |
| 2009/0070288 | A1 | 3/2009 | Herbeck et al. | |

* cited by examiner

*Primary Examiner* — Eleni Shiferaw
*Assistant Examiner* — Paul Callahan
(74) *Attorney, Agent, or Firm* — Edell, Shapiro & Finnan LLC

(57) ABSTRACT

A method and system for detecting and removing sensitive or hidden information in an electronic document. Detection and removal are performed according to one or more document cleansing policies, which specify the types of sensitive or hidden information to detect and remove, for example, confidential information, financial data, profanity, and the like. Individual policies may be distributed to user clients, and may operate in the form of a "plug-in" to various software programs such as word processors, spreadsheet programs, and e-mail clients. When a user creates or edits an electronic document containing undesirable information, the "plug-in" prevents the user from taking an action (such as saving, printing, moving or sending) with respect to the document if it violates the installed policy or policies, until the document is cleansed.

18 Claims, 15 Drawing Sheets

```xml
-<policies xmlns="http://www.itt.com/purifile/policies">
 <policy name="Low" />
 <policy name="Medium" />
-<policy name="High">
-<policy name="PPATest">
 <description />
 <boolean name="WordModule.HasUnrecognizedStreams" value="VIOLATION" />
 <boolean name="WordModule.HasVersionComments" value="VIOLATION" />
 <boolean name="WordModule.HasTrackChanges" value="VIOLATION" />
 <boolean name="WordModule.HasFieldCode" value="VIOLATION" />
 <boolean name="WordModule.HasOfficeArtOffPage" value="VIOLATION" />
 <boolean name="WordModule.HasPictures" value="CONCERN" />
 <boolean name="WordModule.HasLastTenAuthors" value="NOTE" />
 <boolean name="WordModule.HasBookmarks" value="NOTE" />
 <boolean name="WordModule.HasPrinterPath" value="CONCERN" />
 <boolean name="WordModule.HasWhiteText" value="CONCERN" />
 <boolean name="WordModule.HasHiddenFont" value="IGNORE" />
 <boolean name="WordModule.HasRoutingSlip" value="VIOLATION" />
 <boolean name="WordModule.HasComments" value="VIOLATION" />
 <boolean name="WordModule.HasHyperlinks" value="VIOLATION" />
 <boolean name="WordModule.HasHeaderFooters" value="VIOLATION" />
 <boolean name="WordModule.HasHeaderFooterClassification" value="VIOLATION" />
 <boolean name="WordModule.HasMacros" value="VIOLATION" />
 <boolean name="WordModule.HasEmbeddedOfficeFile" value="VIOLATION" />
 <boolean name="WordModule.HasEmbeddedObject" value="VIOLATION" />
 <boolean name="WordModule.HasExternalDataLink" value="VIOLATION" />
 <boolean name="WordModule.HasAlternativeText" value="VIOLATION" />
 <threshold concern="7" name="WordModule.FontSizeLimits" note="7" violation="5" />
 <threshold concern="5" name="WordModule.DarknessLimits" note="15" violation="1" />
 <threshold concern="95" name="WordModule.BrightnessLimits" note="85" violation="99" />
 <threshold concern="5" name="WordModule.ContrastLimits" note="15" violation="2" />
-<whitelist name="WordModule.fieldcodes">
 <entry value="AUTHOR" />
 <entry value="ASK" />
 <entry value="ADVANCE" />
 </whitelist>
 <whitelist name="WordModule.headerfooter" />
 </policy>
 </policy>
 </policies>
```

FIG.1

```
<PPA>
    <Configuration>
        <OnLoad>Always</OnLoad>
        <WarningMsg>Using The Feature May Cause The Document
                    To Be Rejected.</WarningMsg>
    <Configuration>

<ActionList>
        <Action Name="InsertPictures" Id=123>
                <Restriction>Disabled</Restriction>
        </Action>
        <Action Name="FontSizeLimits" Id=456>
                <Restriction>
                    <LessThan value=10>Disabled</LessThan>
                    <LessThan value=12>Warning</LessThan>
                </Restriction>
        </Action>
    </ActionList>
</PPA>
```

FIG. 2

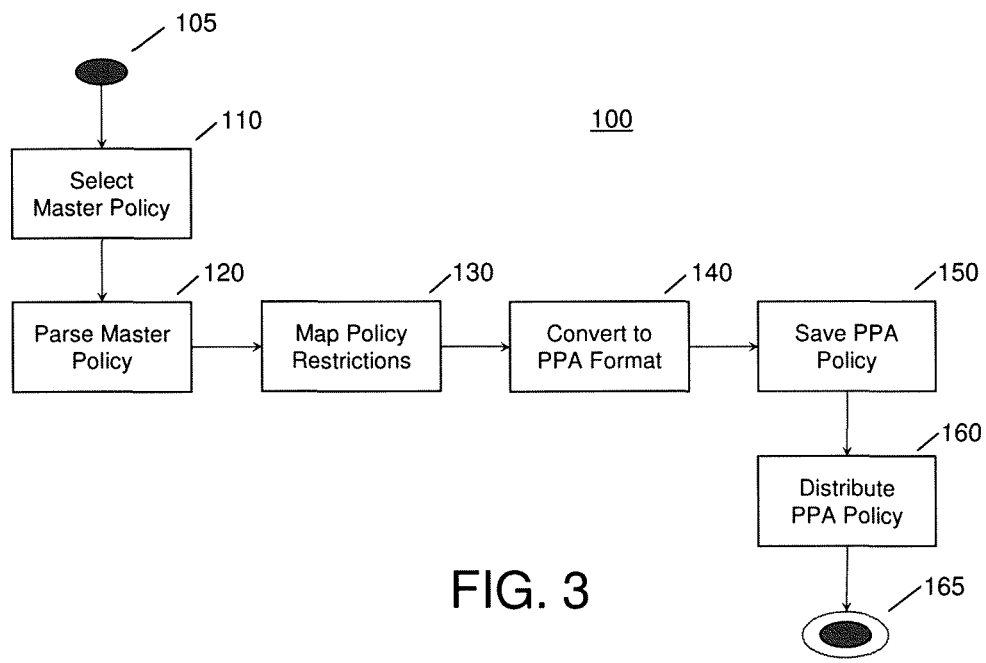

FIG. 3

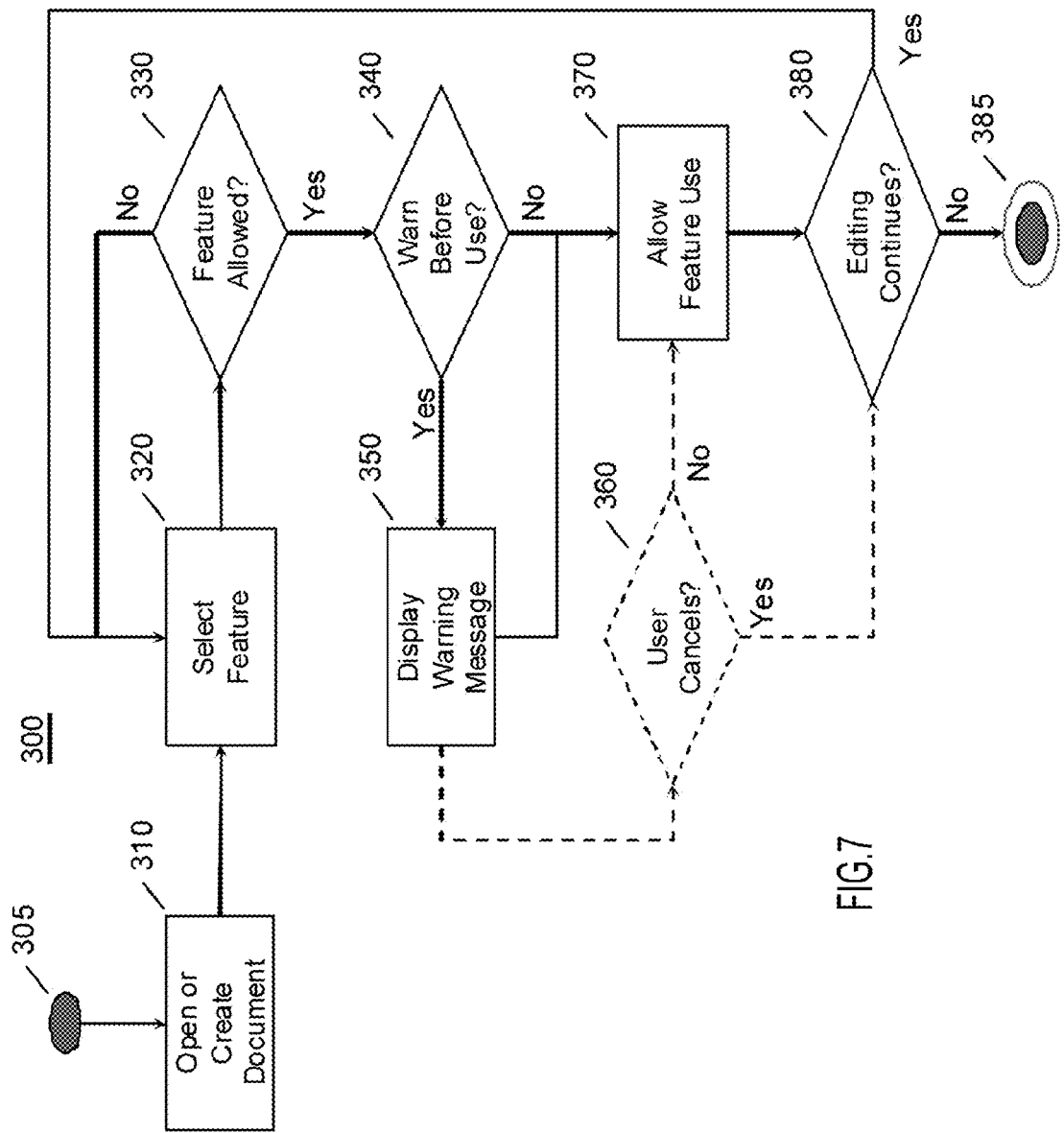

SYSTEMS AND METHODS FOR PROACTIVE DOCUMENT SCANNING

BACKGROUND OF THE INVENTION

Data is an asset to an enterprise and its loss or theft can cause severe harm to the enterprise's business. Many enterprises therefore implement file scanning software to protect their data from being disseminated outside the enterprise. Current file scanning offerings provide a reactive means of security, that is in order to protect an enterprise's data from loss or theft, a file must be first scanned then "cleaned", i.e. all violating content must be adjusted or removed. In a reactive system such as this a document may need to go through this cleaning process multiple times to ensure the document, as it is authored or modified, continues to conform to policy. This multi-step process has failure points that can be exploited either intentionally or unintentionally. The most notable shortcoming of this type of system is that if a file is not scanned, then violations cannot be identified and thus can be disseminated outside the enterprise.

To prevent data loss or theft, a document scanning system that is proactive and difficult to avoid is needed. The need for such a system has heretofore remained unsatisfied.

SUMMARY OF THE INVENTION

Accordingly, embodiments of the present invention include systems and methods for detecting and removing undesirable, e.g., sensitive or hidden, information in an electronic document, or for proactively preventing a user from utilizing a restricted feature of a software application, or both. The feature may be restricted at any desired level of granularity.

In one embodiment, systems or methods for proactively preventing a user from utilizing a restricted feature of a software application are provided, which comprise a software application operable by a user to edit an electronic document by selecting and using features of the software application, and a software module comprising an action listener. The action listener is configured to determine if a first feature in the software application is allowed or non-allowed, where if the first feature is non-allowed, the first feature is disabled so that it cannot be used; to receive a user selection of a second feature in the software application; and to determine whether use of the second feature is allowed with or without a warning, where if the second feature is allowed with a warning, a warning message is displayed to the user, and where if the second feature is allowed without a warning, the user is allowed to use the second feature.

In a different embodiment, systems or methods for detecting and cleansing undesirable information from an electronic document are provided, which comprise a software application operable by a user to edit an electronic document by entering and editing text in the electronic document, and a software module comprising an action listener. The action listener is configured to permit the user to enter and edit text in the electronic document, and to scan the electronic document to determine if undesirable information is present in the electronic document, where if undesirable information is determined to be present, the action listener determines whether the undesirable information is allowed or prohibited, and if the undesirable information is allowed, the action listener displays a warning message to the user, and if the undesirable information is prohibited, the action listener directs the software module to remove the undesirable information from the electronic document.

In yet another embodiment, systems and methods for proactively preventing a user from utilizing a restricted feature of a software application and for detecting and cleansing undesirable information from an electronic document are provided, which comprise a software application operable by a user to edit an electronic document by selecting and using features of the software application, and to enter and edit text in the electronic document, and a software module comprising an action listener. The action listener is configured to permit the user to enter and edit text in the electronic document; to determine if a first feature in the software application is allowed or non-allowed, where if the first feature is non-allowed, the first feature is disabled so that it cannot be used; to receive a user selection of a second feature in the software application; to determine whether use of the second feature is allowed with or without a warning, where if the second feature is allowed with a warning, a warning message is displayed to the user, and where if the second feature is allowed without a warning, the user is allowed to use the second feature; and to scan the electronic document to determine if undesirable information is present in the electronic document, where if undesirable information is determined to be present, the action listener determines whether the undesirable information is allowed or prohibited, and if the undesirable information is allowed, the action listener displays a warning message to the user, and if the undesirable information is prohibited, the action listener directs the software module to remove the undesirable information from the electronic document.

In still further embodiments, systems and methods are provided in which the action listener is further configured to, after display of the warning message, provide the user with an option to cancel the selection of the feature, or provide the user with an option to manually remove the undesirable information from the electronic document. The determination steps can comprise the software module consulting a feature restriction policy, and the scanning can be performed on a periodic basis, or prior to permitting the user to save, print or transmit the electronic document. The undesirable information can be sensitive or confidential data, or can be hidden data such as metadata. The software module can be a plug-in to the software application, which can be a word processor application, PDF document editor application, spreadsheet application, presentation application, or email application. The systems or methods can further comprise a server that is in communication with the software module. The systems or methods can be embodied in a computer program product stored on a tangible storage medium.

The above and still further features and advantages of embodiments of the present invention will become apparent upon consideration of the following detailed description thereof, particularly when taken in conjunction with the accompanying drawings wherein like reference numerals in the various figures are utilized to designate like components.

BRIEF DESCRIPTION OF THE DRAWINGS

FIG. 1 depicts an exemplary document review software policy of a particular embodiment of the present invention.

FIG. 2 depicts an exemplary proactive policy assistant policy corresponding to the document review software policy of FIG. 1.

FIG. 3 is a flowchart illustrating a policy creation wizard of an embodiment of the present invention.

FIGS. 7 and 8 illustrate two different embodiments of a proactive policy assistant of the present invention.

DETAILED DESCRIPTION OF THE PREFERRED EMBODIMENTS

Figure 4A:
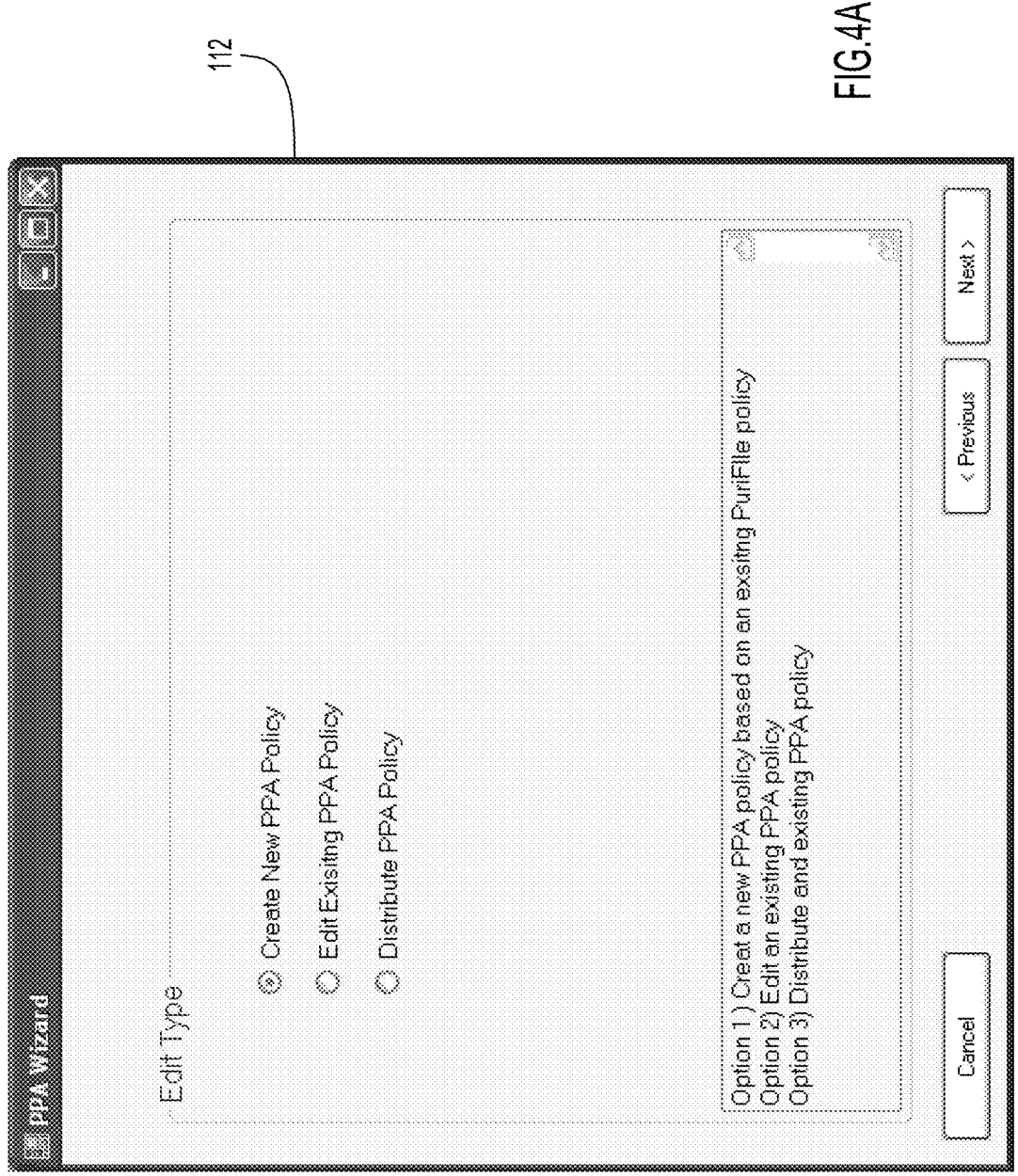
FIG. 4A through 4F are screen shots illustrating a policy creation wizard of an embodiment of the present invention.

The present invention is directed to methods and systems for detecting and removing sensitive, hidden or otherwise undesirable information in an electronic document. Detection and removal are performed according to one or more document cleansing policies, which specify the types of information to detect and remove, for example, confidential information, financial data, profanity, and the like. Individual policies may be distributed to user clients, and may operate in the form of a plug-in to various software programs such as word processors, spreadsheet programs, and e-mail clients. When a user creates or edits an electronic document containing undesirable information, the plug-in warns and/or prevents the user from taking an action (such as saving, printing, moving or sending) if the document violates the installed policy or policies, until the document is cleansed.

The present embodiments provide proactive detection and cleansing by means of a "proactive policy assistant" (PPA) that implements various detection and cleansing policies on a pro-active basis. It is envisioned, although not required, that in certain embodiments the PPA operates in conjunction with another document scanning system, for example a reactive document review system such as ITT Corporation's PuriFile® document review software. In these embodiments, the document scanning system (e.g., PuriFile®) policies may be modified or converted into a format usable by the PPA, to achieve integrated document scanning and cleaning.

The PPA is preferably implemented as a plug-in to a host software application such as a word processor (e.g., Microsoft Word, Corel WordPerfect, Apple Pages, etc.), PDF document editor (e.g., Adobe Acrobat, PDFpen, PDF Studio, etc.), spreadsheet application (e.g., Microsoft Excel, Apple Numbers, etc.), graphics and presentation application (e.g., Microsoft Powerpoint, Microsoft Visio, Apple Keynote, etc.), or an e-mail client (e.g., Microsoft Outlook, Lotus Notes, etc.). The plug-in can be invisible to the user of the application, or can be visible in the application in various ways, for example as a specific toolbar, a menu item or a button on an existing toolbar, or can be visible only by means of a "grayed-out" or disabled function or button. The plug-in is a module of code that can be "plugged-in" to the host application in order to control or alter the behavior of the host application. For example, if the host application is a Microsoft Office application, such as Microsoft Outlook or Microsoft Exchange, the plug-in module can be encoded as an Exchange client extension.

The PPA is programmed to detect and cleanse documents based on various policy settings that set the detection thresholds and reporting criteria used in the inspection process. The electronic documents can be any type of electronic file or data now known or later developed, such as, but not limited to HTML and XML Web content, document images, electronic records, database records, word processing documents, presentation slides, office documents, e-mail messages or archives, textual data, electronic books, graphics, audio, video, SMS or MMS messages, other digital representations of information, and/or combinations thereof. The electronic document may include sensitive, hidden, or otherwise undesirable information or formatting that is desired to be removed from the document prior to saving, printing, or disseminating it.

As used herein, "undesirable" information or formatting includes information or formatting that is not desired to be present in electronic documents. For example, profanity (e.g., "dirty words", scatological terms, vulgar or obscene phrases, etc.) is generally undesirable information. Undesirable formatting may include, for example, font sizes that are too small or too large, margins that are too narrow or too wide, unacceptable brightness levels (too bright or too dim), inclusion of photographs or graphics in a document desired to be text-only, etc. Undesirable info nation can also include sensitive or hidden data or information.

As used herein, "sensitive" data can include information such as financial data, personnel listings, bank account or credit card numbers, social security numbers, phone numbers, email addresses, latitude/longitude coordinates, or other data that is desired to be excluded from documents. As used herein, "hidden" data is data that is not normally visible to a document originator or reviewer. Two categories of hidden data are metadata, and hard-to-see data. Metadata is information generated in the creation and/or update of an electronic document, and includes information on the author, creation date, revision history, document size and other potentially revealing characteristics. Metadata also provides insight into the computer used to create or update the file and its network environment, such as the hostname, network names, e-mail information, etc. Hard-to-see data includes information that is invisible or concealed, either accidentally or intentionally, such as camouflaged data (e.g., white text on a white background), data hidden underneath other pictures, text or graphics, data hidden by moving it off the page, cropping, scaling or otherwise altering an object so as to hide sensitive aspects (e.g., the full image remains in the soft copy of the file despite it being "cropped" for viewing), deleted text (e.g., via "track changes" or other redlining mechanisms), use of very small fonts, etc.

The PPA policy settings are customizable to suit the needs of a particular user or group of users to allow for different concerns at different sites, for example an educational institution might be primarily concerned with removing social security numbers and financial information from documents, whereas a government contractor might be primarily concerned with removing latitude/longitude coordinates and personnel listings from documents. The policy may restrict a user's actions in various ways, for example, the policy may be a feature restriction policy that categorizes each feature or functionality of the software application to which it is "plugged-in" as permissible or impermissible. For example, in a preferred embodiment the PPA policy settings categorize the features and functionality into three restriction levels: allowed (in which case use of the feature/functionality is ignored by the PPA), non-allowed or prohibited (in which case use of the feature/functionality is prevented, for example by disabling the feature), or allowed with a warning (in which case use of the feature/functionality triggers a warning message to the user).

The categorization of the features and functionality can be at any desired degree of granularity, for example, at a coarse granularity, font size selection may be considered as one feature to be either permitted or prohibited, whereas at a fine granularity, each individual font size may be considered as an individual feature to be permitted or prohibited. In such an embodiment, for example, font sizes over 8 points may be an allowed feature, font sizes between 6 and 8 points may be an allowed with a warning feature, and font sizes below 6 points may be a non-allowed feature. The use of fine granularity settings enables a better degree of control over a permitted range or set of acceptable choices for a particular feature or features, instead of cutting off the user's access to an entire range of features. For example, features such as font colors, typefaces, margin sizes, contrast and brightness levels, graphics sizes, column widths and row heights, cropping and scaling ranges, etc. may be categorized at a fine granularity so that the user is permitted to use certain aspects of these features while prohibiting other aspects. Thus, the term "feature" should be understood as encompassing this granularity concept in that a feature may be coarse (e.g., any selection of font size, or an ability to insert graphics into a document) or fine (e.g., a particular font size selection, or a particular type of graphics file).

The policy settings can specify how a particular issue or infraction should be handled, for example whether it should be flagged as a violation or merely as an item of concern. An issue or infraction may be categorized, for example as critical or non-critical, or may be graded based on severity, for example infractions may be categorized or graded on multiple levels such as three, four or more levels. In a preferred embodiment, infractions are categorized as "ignore", "note", "concern" or "violation" based on their respectively increasing severity. In another preferred embodiment, infractions can be categorized as "minor", "major" or "severe", etc.

The policy settings can specify the type of reporting that should be performed, for example whether the user is warned or alerted of a detected violation prior to cleansing, whether cleansing occurs immediately, and whether a report is generated and/or displayed to the user and/or an administrator. For example, the user can be warned or alerted of a violation (e.g., a font size that is too small), and may also be advised as to the reason for the violation (e.g., the font size is insufficient for submission for review). The user can then manually fix the offending item, or the system can automatically fix the offending item. The policy settings can also specify whether the user is permitted to override a detected violation, and certain users may be granted permission to override non-critical or even critical violations in specified circumstances. The administrator may assign individual users or groups of users to different policies, or may design a policy that allows different users or groups of users different privileges.

The policies can be recorded in any suitable form, such as a file, database, or software code. For example, a policy can be written in a format such as, e.g., text, XML, HTML, etc., or can reside in a database table, e.g., in MySQL, Oracle, SQL Server, IBM DB2, Informix or a flat database, etc. In a preferred embodiment, the policies are written in XML. The policies can be adapted to the specific program to which the PPA is plugged-in, for example the policy file can be adapted for Microsoft Word, Adobe Acrobat, or the like. Referring now to FIGS. 1 and 2, an exemplary PuriFile® policy and its corresponding PPA policy, both configured for Microsoft Word and written in xml, are shown.

In those embodiments in which document review software such as PuriFile® is used with the PPA, the document review software policies can be modified or converted into corresponding PPA policies. In an embodiment of the present invention, the conversion between a document review software policy such as a PuriFile® policy and a PPA policy can be accomplished by means of a policy creation wizard. The wizard can also be used by an administrator or other authorized user to edit PPA policies, and/or distribute PPA policies to end-users. FIG. 3 depicts an exemplary policy creation wizard 100, which is operating in a Windows XP environment and is being used to transform a PuriFile® policy into a PPA policy.

As shown in FIG. 3, the policy creation wizard 100 begins at step 105, and at step 110 the administrator or other authorized user selects a master policy (e.g., a PuriFile® or other document review software policy) to be converted into a PPA policy. In step 120, the wizard parses the selected master policy into memory, and provides for the administrator to review the policy contents. The master policy may contain a number of settings, for example it may specify that a document containing version comments or track changes will trigger a particular restriction level, such as a Violation restriction level.

In step 130, the wizard maps the master policy settings into the PPA policy settings. For example, an exemplary PuriFile® policy having four restriction levels (e.g., "Violation", "Concern", "Note" and "Ignore") can be mapped to a PPA policy having three restriction levels ("Disable", "Warning" and "Allow"). The wizard can be configured to automatically map the master policy restriction levels to particular PPA policy restriction levels, or it can be configured to allow the administrator to manually map the various restriction levels. Thus, in an exemplary embodiment, the wizard can be configured to map a PuriFile® policy "Violation" restriction level to a PPA policy "Disable" restriction level. The wizard may also provide for the administrator to enter a custom warning message to be displayed when the "Warning" restriction level is triggered.

In step 140, the PPA policy is created based on the parsed master policy and the mapped settings, and stored in memory in the PPA format. In step 150, the PPA policy is saved in a location and filename chosen by the administrator. In step 160, the administrator distributes the new PPA policy to the end users. Distribution may occur by any suitable means, such as uploading the policy to a network drive, emailing the policy, or making the policy available via FTP so that end user systems can access the policy. For example, the policy creation wizard can provide an option allowing the administrator to choose a particular drive or location to which the policy can be uploaded. In step 165, the policy creation wizard 100 is terminated.

Figure 4B:
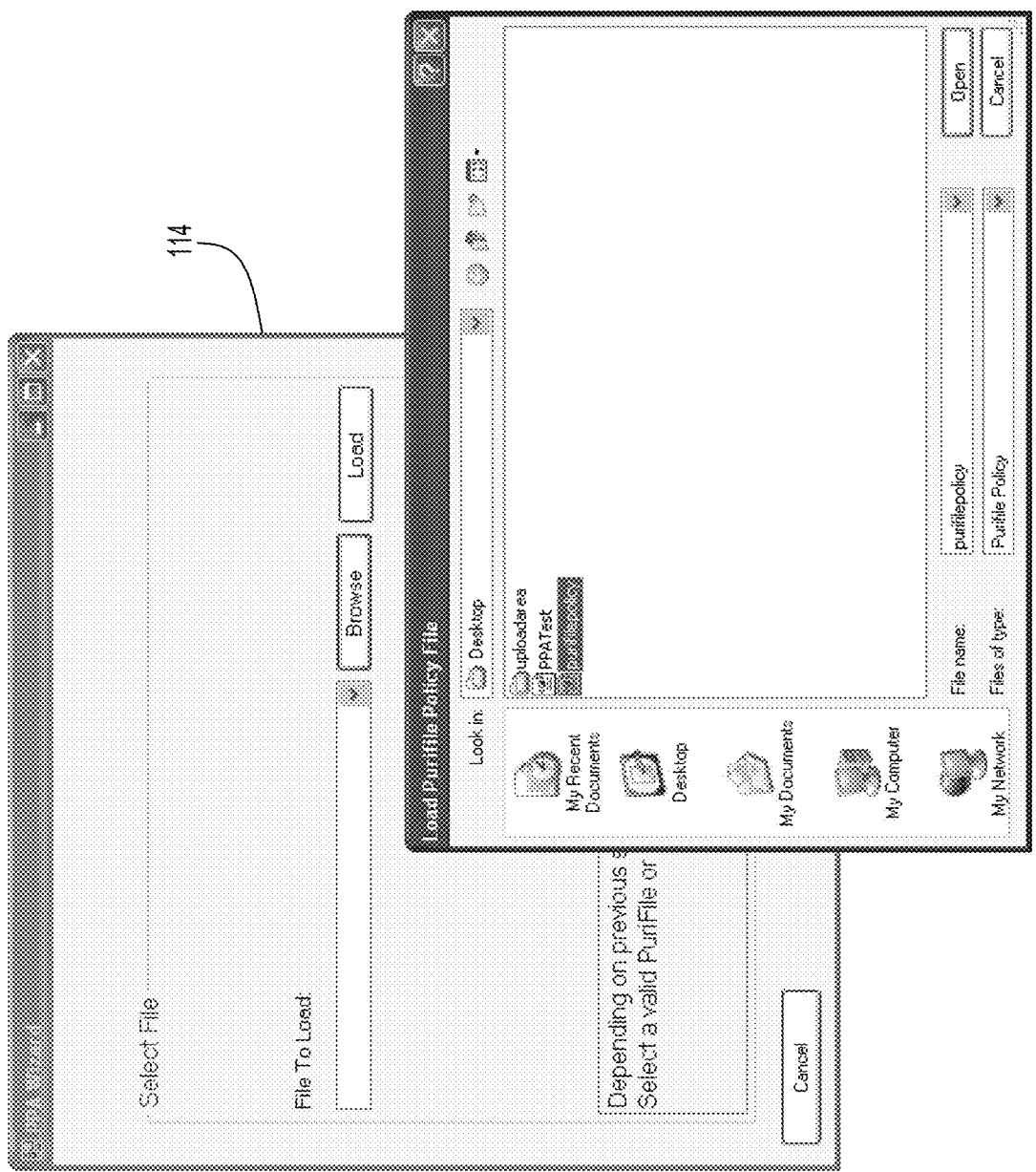
Figure 4C:
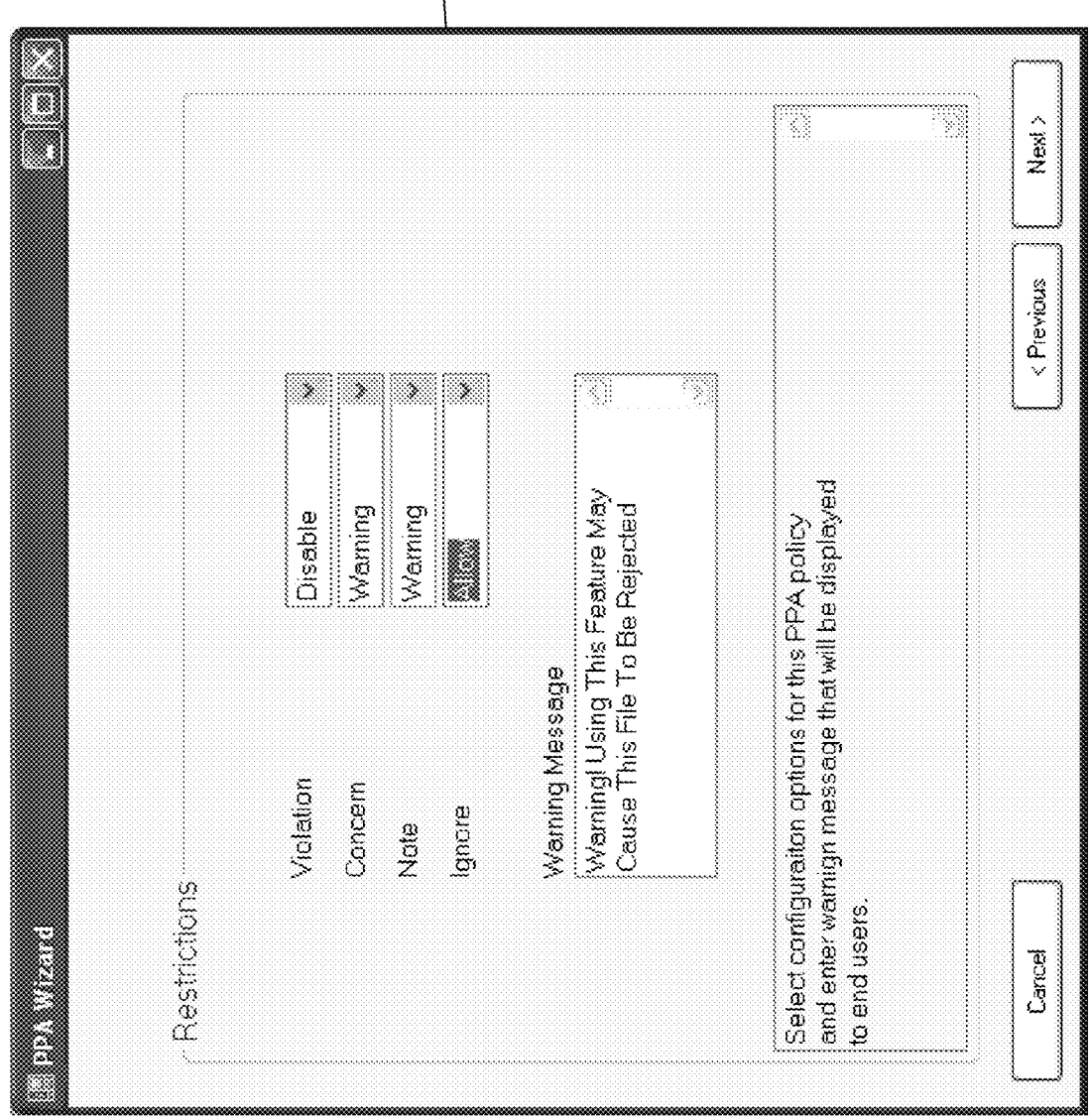
Figure 4D:
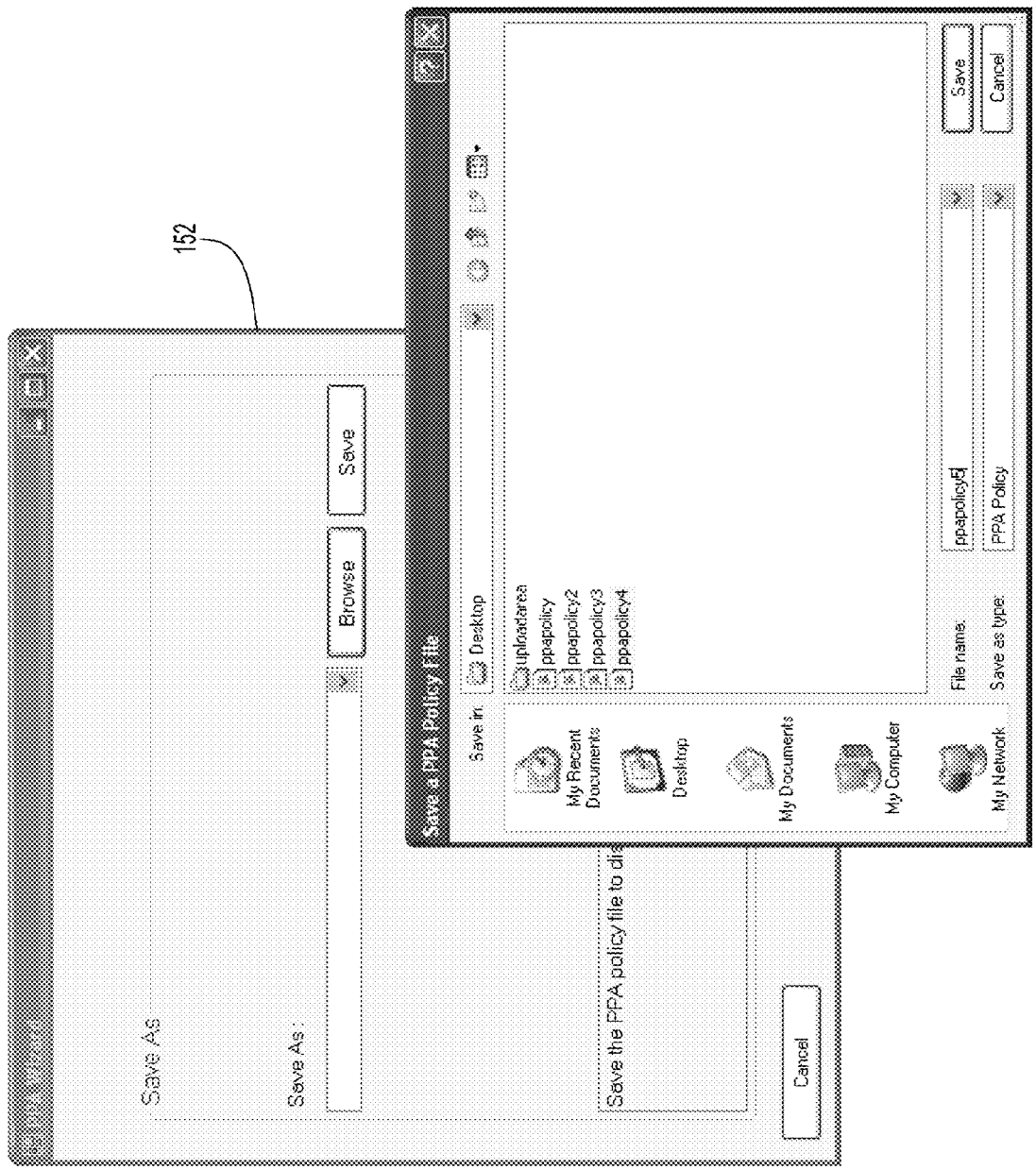
Figure 4E:
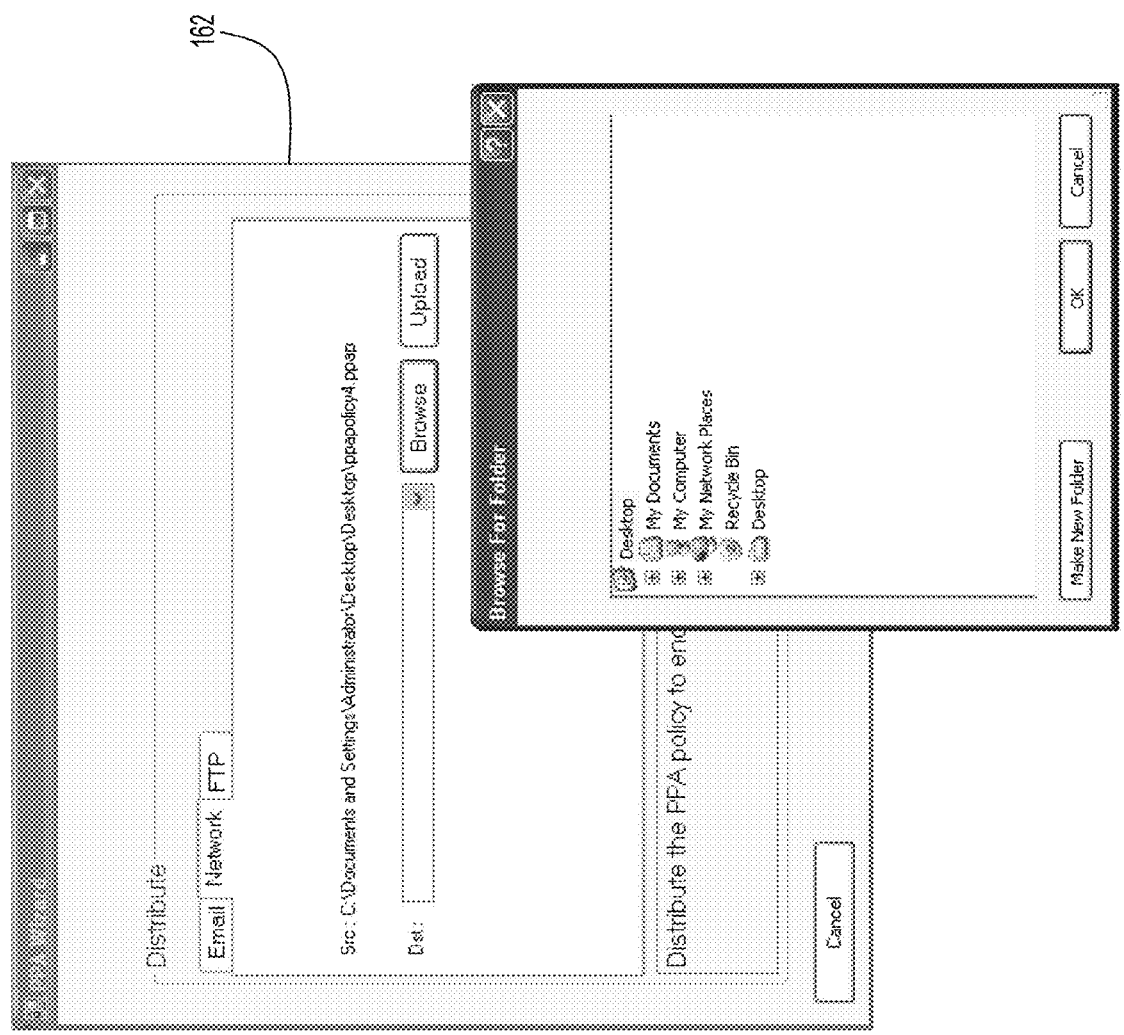
Figure 4F:
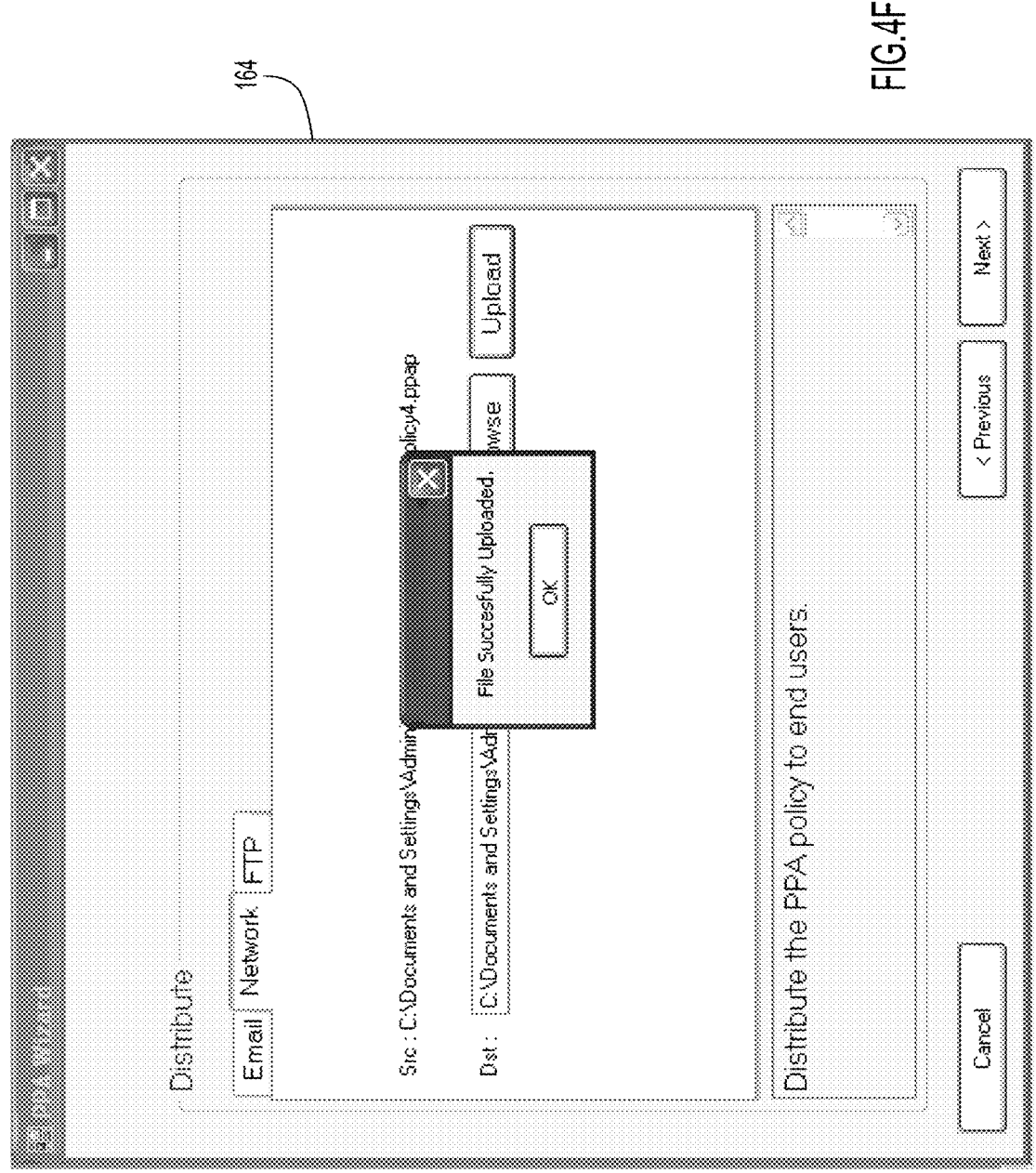

Exemplary screen shots depicting an embodiment of a policy creation wizard are illustrated in FIGS. 4A through 4F. FIGS. 4A and 4B illustrate various aspects of step 110, in which a selection screen 112 is displayed, so that the administrator can choose whether to create, edit or distribute a PPA policy, and in which a selection screen 114 is displayed, so that the administrator can select a particular policy file. FIG. 4C illustrates an aspect of step 130, in which a restriction mapping selection screen 132 is displayed, allowing the administrator to choose a particular PPA restriction level for each document review software restriction level. FIG. 4D illustrates an aspect of step 150, in which a PPA policy save screen 152 is displayed, so that the administrator can select a name under which to save a particular PPA policy. FIGS. 4E and 4F depict various aspects of step 160, in which a distribution selection screen 162 is displayed, so that the administrator can select a policy for distribution, and a location to which the policy is to be distributed, and in which a distribution confirmation screen 164 is displayed, so that the administrator receives confirmation that the policy has been uploaded to the chosen location.

The PPA policy can be installed in a number of ways, for example automatically or manually. Automatic installation loads the PPA policy without user action, for example a PPA policy plug-in may automatically contact a server for applicable policies when its host application loads, or a server may automatically push applicable policies (e.g., new or updated policies) to the PPA plug-in for automatic installation at various times, e.g., periodically, whenever a policy is created or updated, or whenever the host application is loaded. The PPA policy can also be installed manually, whereby an administrator or authorized user selects and installs a particular policy.

Figure 5:
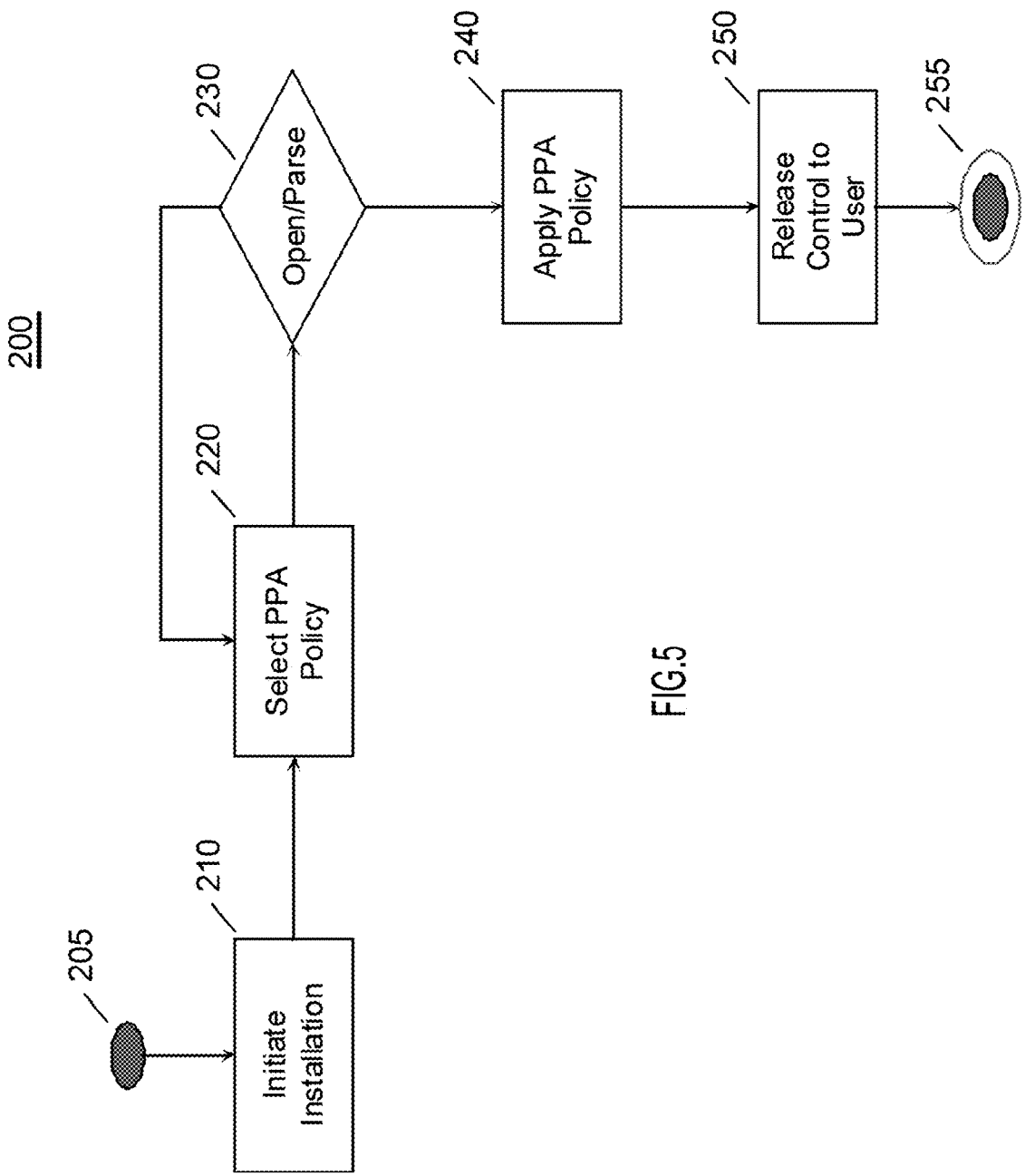
FIG. 5 is a flowchart illustrating a policy installation wizard of an embodiment of the present invention.

Installation may be accomplished using a policy installation wizard. FIG. 5 depicts an exemplary policy installation wizard 200, which is operating in a Windows XP environment. As shown in FIG. 5, the policy installation wizard 200 is initiated at step 205, and at step 210 the administrator or other authorized user initiates the installation process, for example by manually selecting a menu option, or simply by opening the host application and thus triggering an automatic installation. In step 220, a particular PPA policy is selected for loading, for example automatically by the PPA plug-in contacting a server to download or pull new or updated policies from the server, or a server pushing a policy or policies to the PPA plug-in, or manually, for example by an administrator selecting a PPA policy to be loaded by navigating to a particular file using a browser window. In step 230 the selected policy is parsed into memory, for example, as a list or array, so that it can be used by the plug-in code.

In step 240, the policy installation wizard 200 goes through the parsed policy to identify features in the application that are at various restriction levels. For example, if the application is a Microsoft Office application, the wizard extracts an identification number indicating a particular feature to be modified from the parsed policy, or looks up an identification number based on information in the parsed policy, and then uses the identification number and the MSOffice API to apply the desired restriction level to the identified feature. Once the PPA policy has been applied, control of the application is released to the user in step 250, and the policy installation wizard 200 is terminated in step 255.

Figure 6A:
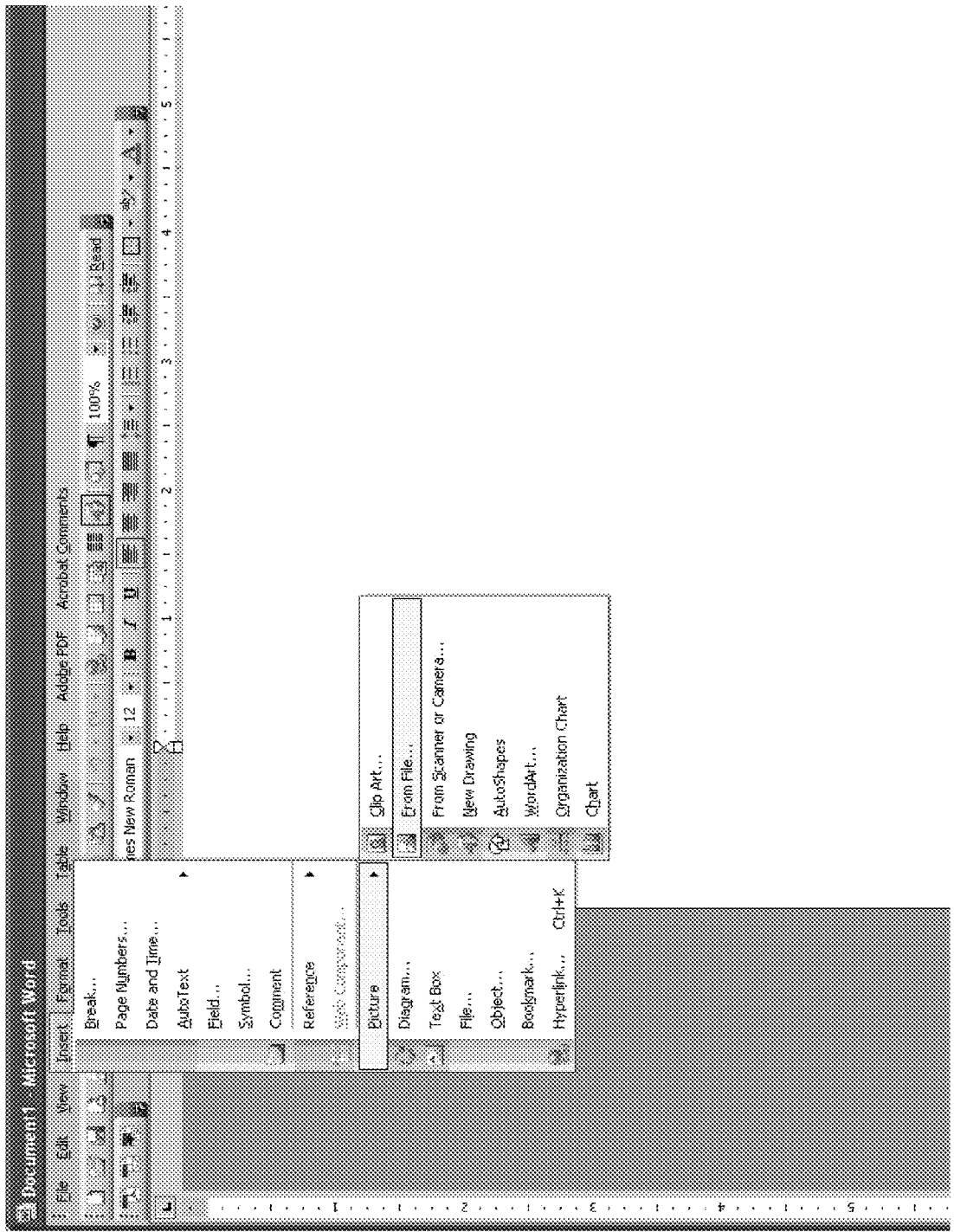
FIG. 6A through 6D are screen shots illustrating a policy installation wizard of an embodiment of the present invention.
Figure 6B:
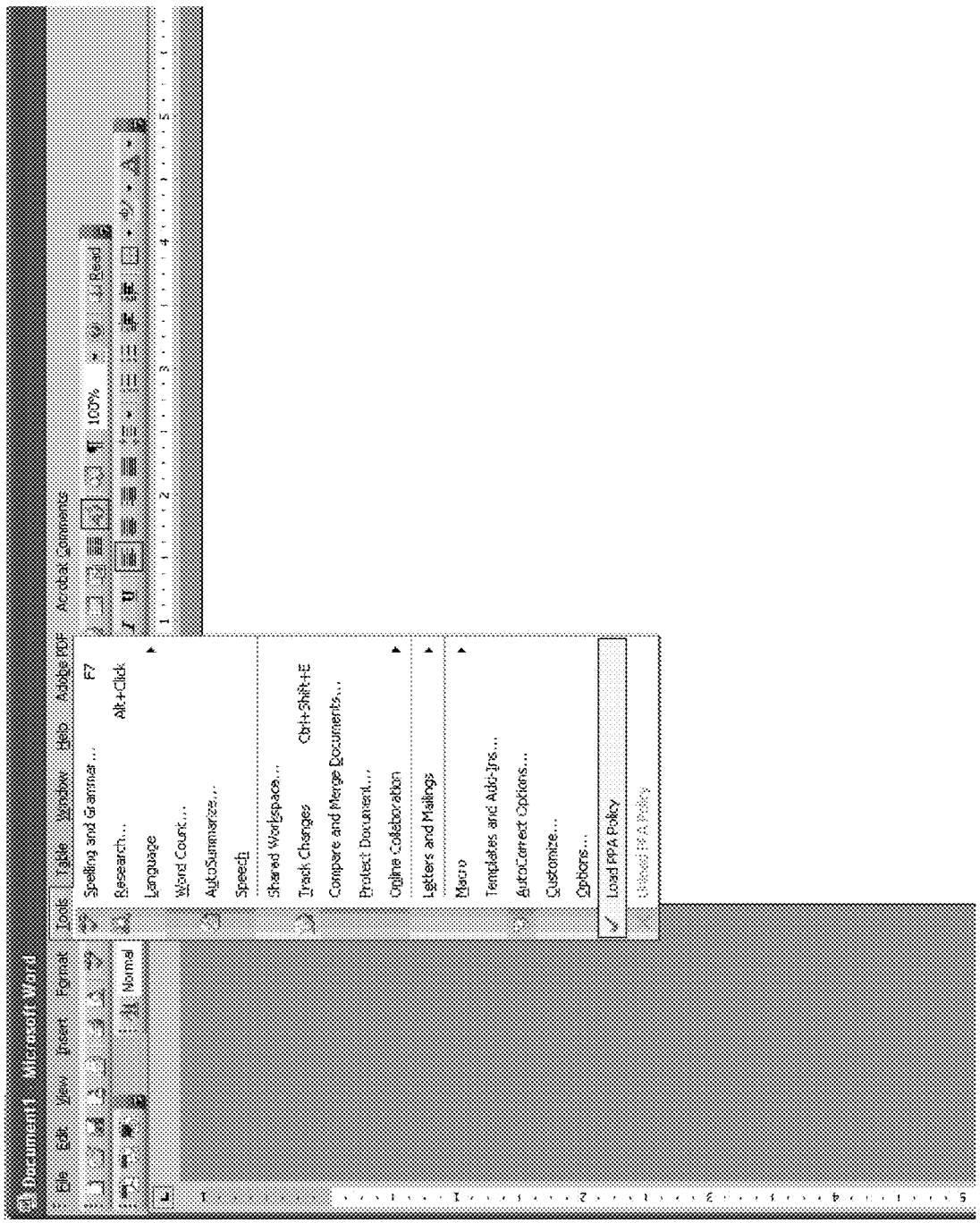
Figure 6C:
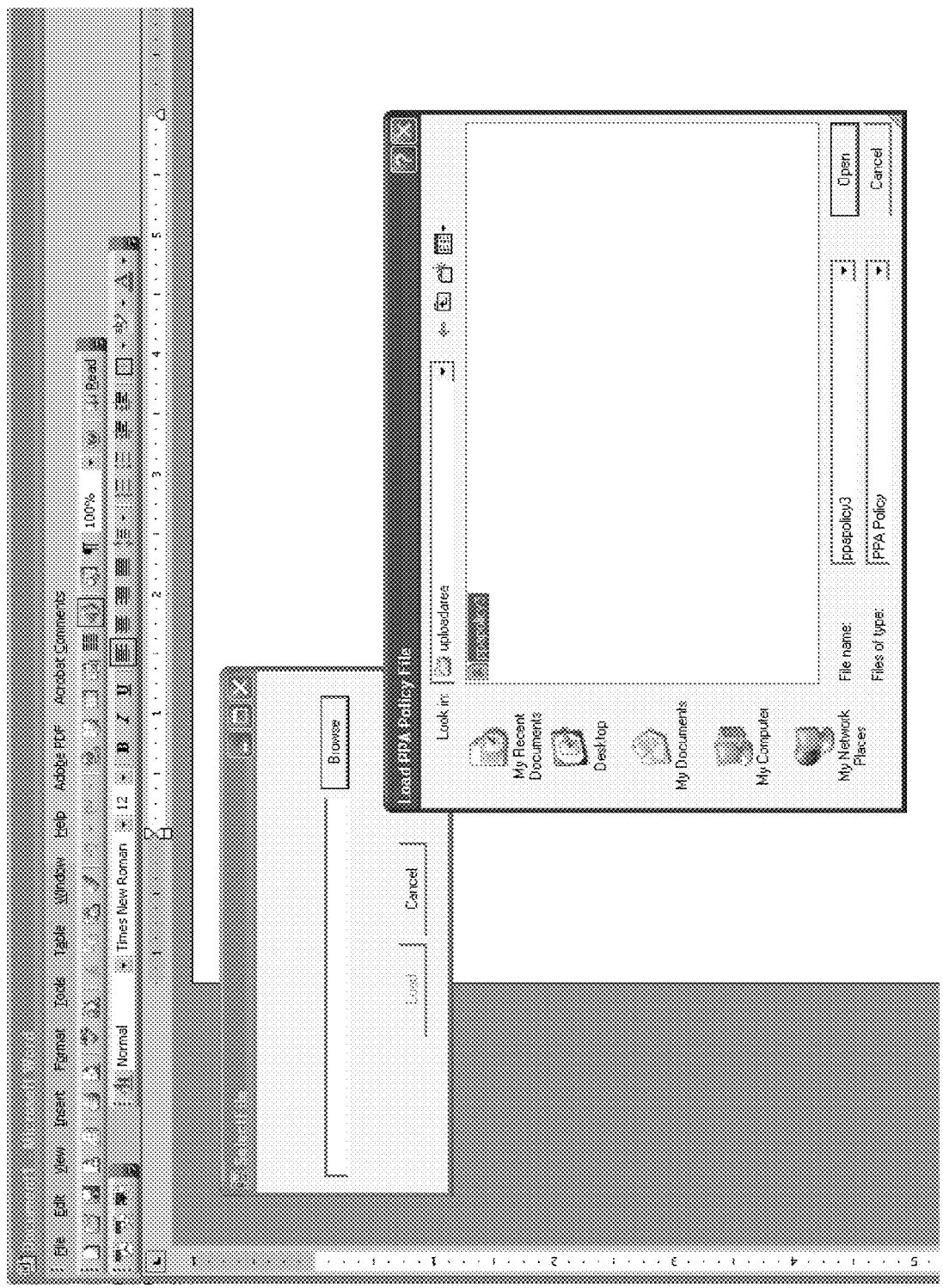
Figure 6D:
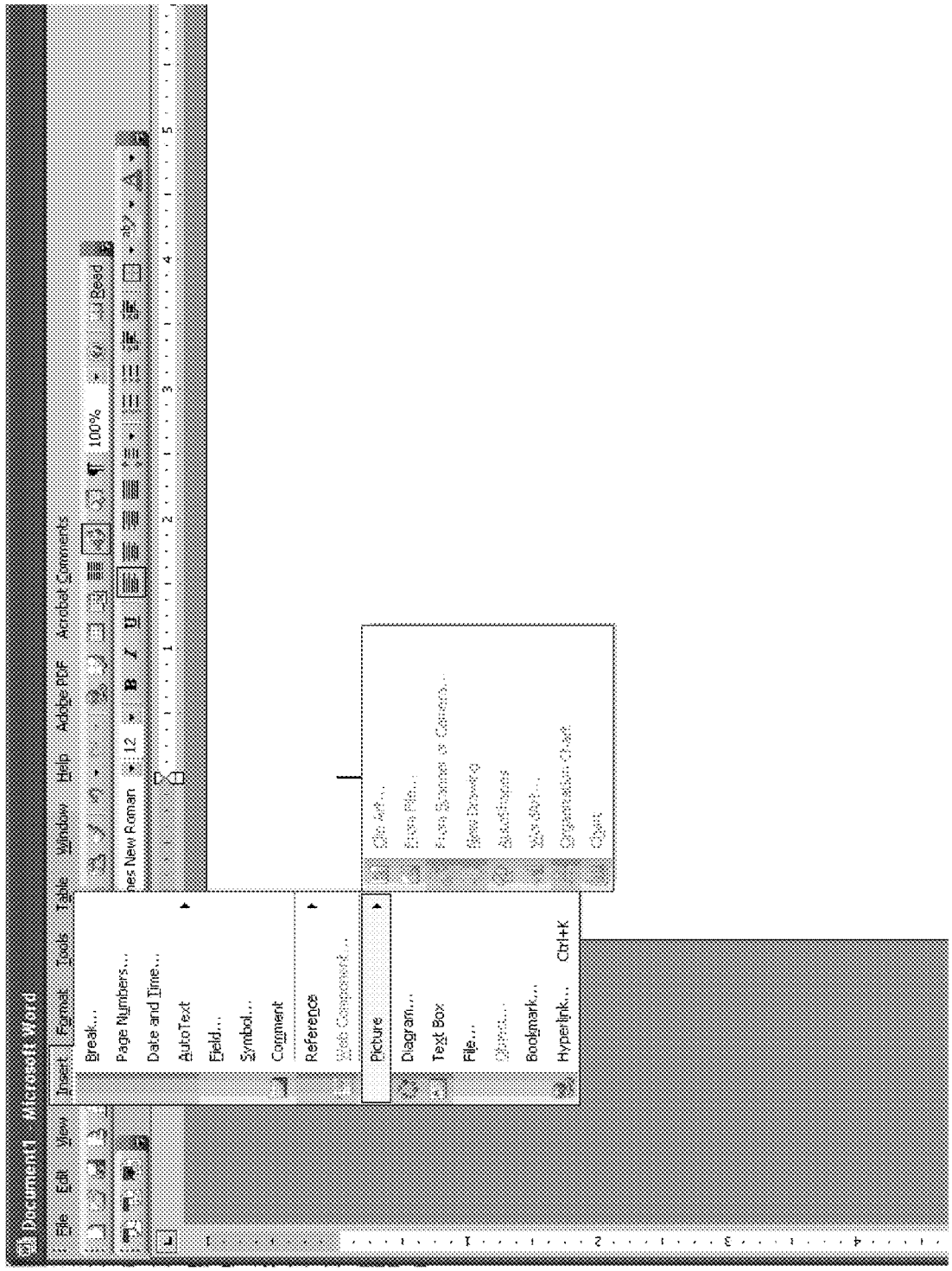

Exemplary screen shots depicting an application into which a PPA policy will be installed are shown in FIGS. 6A through 6D. FIG. 6A depicts an application (in the illustrated embodiment, Microsoft Word) in which the plug-in has not yet been installed. FIG. 6B shows the user selecting a menu option to load a PPA policy, and FIG. 6C depicts the user navigating to a particular PPA policy file to be loaded using a browser window. FIG. 6D depicts an application (in the illustrated embodiment, Microsoft Word) in which the plug-in has been installed, and certain features (here, the menu options for inserting a picture into a document) have been disabled so that they cannot be selected.

Figure 8:
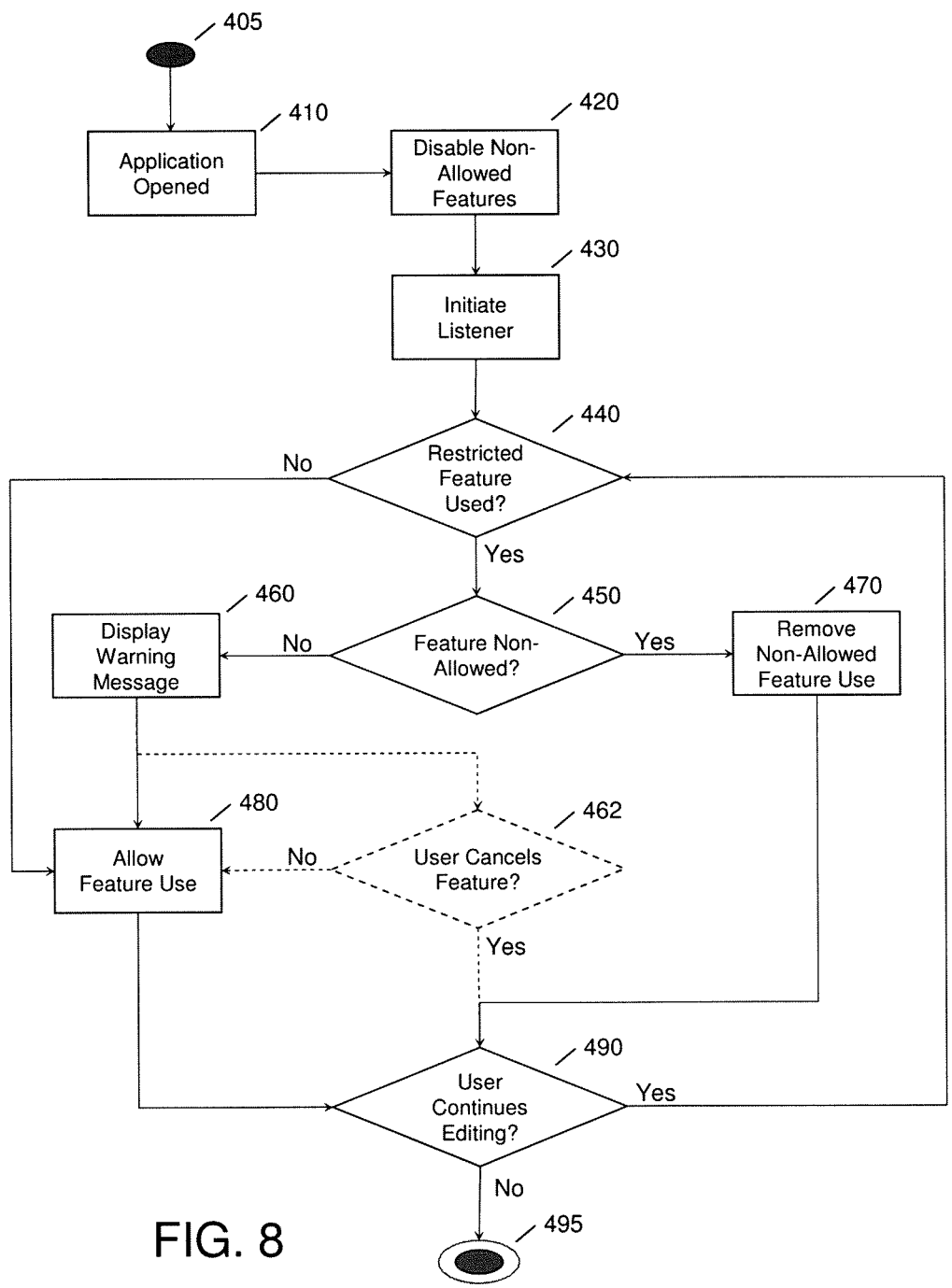

FIGS. 7 and 8 depict two different embodiments of a PPA plug-in module in operation. In FIG. 7, the PPA plug-in module 300 is initiated at step 305, and in step 310 a document is opened or created. In step 320, the user selects a desired feature (e.g., an "insert picture" or "insert hyperlink" feature) by, e.g., navigating to a menu item, navigating to a feature button on a toolbar, or hitting a particular keyboard shortcut. Then, in step 330, the PPA plug-in checks to see if the selected feature is allowed, and if it is not, the user is denied permission to the disabled feature, and has the opportunity to select a different feature (e.g., print, font size control, etc.). If the feature is allowed, then the PPA plug-in proceeds to step 340, in which the PPA plug-in module checks to see if the selected feature is at the warning restriction level. If it is, then the PPA plug-in proceeds to step 350, in which a warning message is displayed to the user, e.g., indicating that use of this particular feature may result in a security violation, before proceeding to step 370, where the user is allowed to use the feature, and then to step 380. Optionally, the PPA plug-in may provide the user with a choice to proceed with the selected feature or cancel, at step 360. If the user chooses not to cancel, the PPA plug-in proceeds to step 370, allowing the use of the feature, and then to step 380. If the user chooses to cancel (at step 360), the PPA plug-in proceeds to step 380. If the feature is not at the warning restriction level, then the PPA plug-in proceeds from step 340 to step 370, where the user is allowed to use the feature, and then to step 380. At step 380, the PPA plug-in determines whether the user is continuing to edit the document. If yes, the module cycles back to step 320 where the user is permitted to select other features. If no, e.g., the user closes the document, the module proceeds to step 385, where it is terminated.

In an embodiment of the invention in which a fine granularity of control over a particular feature or features is desired, the PPA plug-in module depicted in FIG. 7 can operate as follows to implement a policy prohibiting the selection of certain font sizes, colors and typefaces, and providing for a warning when certain sizes, colors or typefaces are selected. In this embodiment, the user opens a host application such as Microsoft Word, and the PPA plug-in module begins (step 305). The user opens or creates a new document (step 310) and proceeds to enter text in the default font. The user then highlights some text, navigates to a font selection menu, and selects a font size of 6 points (step 320). The PPA plug-in checks the font size settings, determines that the selected font size is non-allowed, and denies the user the use of this font size (step 330). The user then selects a font size of 10 points (step 320), and the PPA plug-in determines that this selected size is allowed without any required warning (steps 330 and 340) and proceeds to allow the font size selection (step 370). The user continues to edit the document (step 380) and then selects a font color of yellow for some text (step 320). The PPA plug-in determines that this feature selection is allowed with a warning (steps 330 and 340), and proceeds to display a warning message to the user, indicating that the chosen color may lead to problems with visibility in the document (step 350). The user is provided with an option to cancel the color choice (step 360) and the user chooses to cancel. The user then saves and closes the document, stopping the editing process (step 380). The PPA plug-in module then terminates (step 385).

In a slightly different embodiment shown in FIG. 8, the PPA plug-in module 400 is initiated at step 405, and in step 410 the host application for the plug-in is opened or loaded. In step 420, the plug-in module 400 disables non-allowed features that are at the disable restriction level, and in step 430 the plug-in module 400 initiates an action listener. The action listener provides additional protection, because certain non-allowed features cannot be easily disabled. For example, even if a particular policy indicates that credit card numbers are not permitted to be included in documents, there is no easy way to prevent such inclusion initially, except by preventing the user from entering any numeric digits in a document, which would generally be an undesirable option. Accordingly, the action listener actively "listens" for policy violations, for example by running periodic scans of a document, or by scanning a document before allowing printing or saving, etc. If the action listener detects the use of a restricted feature or functionality, the restricted use can be fixed or removed, or allowed, depending on the policy settings and the restriction level for this feature or functionality.

In step 440, the action listener monitors the end-user's selection of features and functionality when the application is in use. If the selected feature or functionality is not restricted, then the plug-in module proceeds to step 480 where the use of the feature is allowed, and then to step 490, where it determines whether the user is continuing to edit the document. If yes, the module cycles back to step 440 where the action listener continues to monitor the end-user's selection of features and functionality. If no, e.g., the user closes the document, the module proceeds to step 495, where it is terminated.

If the end-user selects a restricted feature or functionality, the plug-in module 400 proceeds to step 450, in which the plug-in determines what restriction level applies to the selected feature or functionality. If the feature is at a restriction level that does not prohibit all use of the feature, but does not automatically allow all use of the feature, then the plug-in module proceeds to step 460, in which a warning message is displayed to the user, e.g., indicating that use of this particular feature or functionality may result in a security violation, before proceeding to allow the feature use at step 480, and then proceeding to step 490. Optionally, the plug-in module may provide the user with a choice to proceed with the selected feature or cancel, at step 462. If the user chooses not to cancel, the plug-in module proceeds to step 480, where the feature use is allowed, and then to step 490. If the user chooses to cancel, the plug-in module proceeds to step 490. If the feature is at a restriction level that prohibits all use of the feature, then the plug-in module proceeds to step 470, where the module provides for the removal of the non-allowed feature, either automatically or by providing the user with a option to remove the feature, before proceeding to step 490. From step 490, the module proceeds as described above.

In an embodiment of the invention, the PPA plug-in module depicted in FIG. 8 can operate as follows to implement a policy prohibiting the insertion of graphics into documents, providing for a warning when sensitive information such as credit card numbers and account numbers appear in the document, prohibiting font sizes below 10 points, and providing for a warning when a font size smaller than 12 points is used. The user opens a host application such as Microsoft Word, and the PPA plug-in module begins (steps 405 and 410). The PPA plug-in module disables non-allowed features (e.g., the "insert picture" feature and font sizes smaller than 10 points) at step 420, and then initiates an action listener at step 430.

The user enters information into the document, including a credit card number. At step 440, the action listener detects the credit card number in the document, for example by automatically searching the document for a string of numeric digits that is 14-16 digits in length prior to allowing the user to save or print the document. The action listener then determines at step 450 if the detected numeric string is a credit card number, for example by using a well-accepted test for the validation of credit card numbers such as the Luhn formula, and if the numeric string is a valid credit card number, the PPA plug-in module checks the policy to determine if inclusion of a credit card number is prohibited, or whether the use is allowed after a warning. If the inclusion is prohibited, then the plug-in module proceeds to step 470, where the plug-in module directs the removal of the credit card number, for example by removing the credit card number from the document. The plug-in module then proceeds to step 490 and further as described above.

The user continues to edit the document, e.g., by entering text into the document, and formats some text to have a font size of 11 points. The action listener detects the font size, and determines whether this font size is allowed (at steps 440 and 450) by checking the policy. Because the policy permits this font size to be used with a warning, the PPA plug-in module proceeds to step 460, where a warning message is displayed to the user indicating that the font size used is smaller than desired. The PPA plug-in module may or may not provide the user with an option to cancel the font size selection (step 462), or it may simply proceed to allow the font size selection after the warning (step 480). The module then proceeds as described above.

The embodiments of the present invention can take the form of an entirely hardware embodiment, an entirely software embodiment or an embodiment containing both hardware and software elements. In a preferred embodiment, the invention is implemented in software, which includes but is not limited to firmware, resident software, microcode, etc. The software may be available on a recordable medium (e.g., magnetic, optical, floppy, DVD, CD, etc.) or in the form of a carrier wave or signal for downloading from a source via a communication medium (e.g., network, LAN, WAN, Intranet, Internet, etc.). The software may be part of an operating system or a specific application, component, program, module, object, or sequence of instructions.

It is to be understood that the software may be implemented in any desired computer language and could be developed by one of ordinary skill in the computer arts based on the functional descriptions contained in the specification and flow charts illustrated in the drawings. By way of example only, the software may be implemented in the C#, C++, Python, Java, XML or PHP programming languages, and data storage may be implemented in MySQL, Oracle, SQL Server, IBM DB2, Informix or a flat database, etc. Further, any references herein to software performing various functions generally refer to computer systems or processors performing those functions under software control.

The computer systems may alternatively be implemented by any type of hardware and/or other processing circuitry. The various functions of the computer systems may be distributed in any manner among any quantity of software modules or units, processing or computer systems, objects, data structures and/or circuitry, where the computer or processing systems may be disposed locally or remotely to each other and communicate via any suitable communications medium (e.g., LAN, WAN, Intranet, Internet, hardwire, modem connection, wireless, etc.). The software and/or algorithms described above and illustrated in the flow charts may be modified in any manner that accomplishes the functions described herein. In addition, the functions in the flow charts or description may be performed in any order that accomplishes a desired operation.

Furthermore, the present embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. In a preferred embodiment, the computer-usable or computer-readable medium is a tangible medium.

A processing system suitable for storing and/or executing program code may be implemented by any conventional or other computer or processing systems preferably equipped with a display or monitor, a base (e.g., including the processor, memories and/or internal or external communications devices (e.g., modem, network cards, etc.) and optional input devices (e.g., a keyboard, mouse or other input device)). The system can include at least one processor coupled directly or indirectly to memory elements through a system bus. Memory may be implemented by any conventional or other memory or storage device (e.g., RAM, cache, flash, etc.), and may include any suitable storage capacity. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the processing system to become coupled to other processing systems or remote printers or storage devices through intervening private or public networks. Modems, cable modem and Ethernet cards are just a few of the currently available types of network adapters.

End-user systems may be implemented by any quantity of conventional or other computer systems or devices (e.g., computer terminals, personal computers (e.g., IBM-compatible, Apple MacIntosh, tablet, laptop, netbook, etc.), cellular telephone, personal data assistant (e.g., Palm Pre, Treo, iPhone, etc.), etc.) and may include any commercially available operating system (e.g., AIX, Linux, OSX, Sun Solaris, Unix, Windows XP, etc.) and any commercially available or custom software (e.g., browser software, communications software, word processing software, etc.). These systems may include types of displays and input devices (e.g., keyboard, mouse, voice recognition, etc.) to enter and/or view information. The end-user systems may be local to the process and data storage areas, or remote from and in communication with the server and data storage areas via a network.

Networks may be implemented by any quantity of any suitable communications media (e.g., WAN, LAN, Internet, Intranet, wired, wireless, etc.). The computer systems may include any conventional or other communications devices to communicate over the networks via any conventional or other protocols, and may utilize any type of connection (e.g., wired, wireless, etc.) for access to the network.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for proactively preventing a user from utilizing a restricted feature of a software application and for detecting and cleansing undesirable information from an electronic document, comprising:
  a software application operable by a user on one or more computing devices, to edit an electronic document by selecting and using features of the software application to enter and edit text in the electronic document; and
  a software module comprising an action listener, on one or more computing devices, wherein the action listener is configured to:
  access a plurality of policies defining protections to apply to the electronic document;
  disable a first manner of editing in the electronic document in response to opening the document and in response to a first policy;
  scan contents of the electronic document;
  determine that document content corresponding to the disabled first manner of editing the document is present in the document in response to the first policy;
  determine a level of protection to apply to the disabled first manner of editing the document;
  display a warning message in response to the determining the level of protection, wherein if the disabled first manner of editing is prohibited, the action listener directs the software module to remove content of the disabled manner of editing the document;
  permit the user to edit the electronic document according to a second manner of editing the document;
  determine that the second manner of editing is non-allowed based on content of the second manner of editing and in response to a second policy;
  display a warning message to the user in response to the second policy;
  permit the user to edit the electronic document according to a third manner of editing the document;
  determine the third manner of editing corresponds to one of a plurality of restricted entry of text and/or editing methods in response to a third policy; and
  scan the electronic document to determine if undesirable information in content of the third manner of editing is present in the electronic document, wherein if undesirable information is determined to be present based on the content of the third editing, the action listener determines whether the undesirable information is allowed or prohibited, and if the undesirable information is allowed, the action listener displays a warning message to the user prior to permitting the user to save, print, or transmit the electronic document, and if the undesirable information is prohibited, the action listener directs the software module to remove the undesirable information from the electronic document prior to permitting the user to save, print, or transmit the electronic document.

2. The system of claim 1, wherein at least one of determining the second manner of editing is non-allowed or determining the third manner of editing is non-allowed comprises applying a Luhn formula to the editing.

3. The system of claim 1, wherein the undesirable information comprises at least one of longitude coordinates or latitude coordinates.

4. The system of claim 1, wherein at least one of determining the second manner of editing is non-allowed or determining the third manner of editing is non-allowed comprises determining editing metadata is non-allowed.

5. The system of claim 1, further comprising a server that is in communication with the software module.

6. The system of claim 1, wherein the system is a computer program product stored on a tangible storage medium.

7. The system of claim 1, wherein at least one of determining the first manner of editing is non-allowed or determining the second manner of editing is non-allowed comprises determining the manner of entering text and/or editing is non-allowed based on the formatting of the editing.

8. The system according to claim 1, wherein disabling the first manner of editing in the electronic document comprises greying-out a menu item corresponding to the first manner of editing.

9. The system of claim 1, wherein the disabled manner of editing the document comprises entering hidden data.

10. The system of claim 1, wherein determining the level of protection to apply to the disabled first manner of editing the document comprises determining the level of protection based on the formatting of the editing.

11. A method for proactively preventing a user from utilizing a restricted feature of a software application and for detecting and cleansing undesirable information from an electronic document, comprising:

editing an electronic document, via a software application operable by a user on one or more computing devices, by selecting and using features of the software application to enter and edit text in the electronic document; and accessing, via a software module comprising an action listener on one or more computing devices, a plurality of policies defining protections to apply to the electronic document;

disabling, via the action listener, a first manner of editing in the electronic document in response to opening the document and in response to a first policy;

scanning, via the action listener, contents of the electronic document;

determining, via the action listener, that document content corresponding to the disabled first manner of editing the document is present in the document in response to the first policy;

determining, via the action listener, a level of protection to apply to the disabled first manner of editing the document;

displaying, via the action listener, a warning message in response to the determining the level of protection, wherein if the disabled first manner of editing is prohibited, the action listener directs the software module to remove content of the disabled manner of editing the document;

permitting, via the action listener, the user to edit the electronic document according to a second manner of editing the document;

determining, via the action listener, that the second manner of editing is non-allowed based on content of the second manner of editing and in response to a second policy;

displaying, via the action listener, a warning message to the user in response to the second policy;

permitting, via the action listener, the user to edit the electronic document according to a third manner of editing the document;

determining, via the action listener, the third manner of editing corresponds to one of a plurality of restricted entry of text and/or editing methods in response to a third policy; and scanning, via the action listener, the electronic document to determine if undesirable information in content of the third manner of editing is present in the electronic document, wherein if undesirable information is determined to be present based on the content of the third editing, the action listener determines whether the undesirable information is allowed or prohibited, and if the undesirable information is allowed, the action listener displays a warning message to the user prior to permitting the user to save, print, or transmit the electronic document, and if the undesirable information is prohibited, the action listener directs the software module to remove the undesirable information from the electronic document prior to permitting the user to save, print, or transmit the electronic document.

12. The method of claim 11, wherein at least one of determining the second manner of editing is non-allowed or determining the third manner of editing is non-allowed comprises applying a Luhn formula to the editing.

13. The method of claim 11, wherein the undesirable information comprises at least one of longitude coordinates or latitude coordinates.

14. The method of claim 11, wherein at least one of determining the second manner of editing is non-allowed or determining the third manner of editing is non-allowed comprises determining editing metadata is non-allowed.

15. The method of claim 11, wherein at least one of determining the first manner of editing is non-allowed or determining the second manner of editing is non-allowed comprises determining the manner of entering text and/or editing is non-allowed based on the formatting of the editing.

16. The method of claim 11, wherein disabling the first manner of editing in the electronic document comprises greying-out a menu item corresponding to the first manner of editing.

17. The method of claim 11, wherein the disabled manner of editing the document comprises entering hidden data.

18. The method of claim 11, wherein determining the level of protection to apply to the disabled manner of editing the document comprises determining the level of protection based on the formatting of the editing.

* * * * *